United States Patent [19]

Sakakibara et al.

[11] Patent Number: 4,864,553
[45] Date of Patent: Sep. 5, 1989

[54] APPARATUS FOR CONTROLLING ROTATION OF A RUN LENGTH LIMITED CODE MODULATED INFORMATION RECORDING MEDIUM

[75] Inventors: Yoshio Sakakibara, Moriguchi; Ryo Akiyama; Shoichi Inatomi, both of Hirakata; Noriyuki Ema, Hirakata, all of Japan

[73] Assignee: Matsushita Electric Industrial Co., Ltd., Osaka, Japan

[21] Appl. No.: 222,379

[22] Filed: Jul. 13, 1988

Related U.S. Application Data

[63] Continuation of Ser. No. 865,010, May 20, 1986, abandoned.

[30] Foreign Application Priority Data

May 29, 1985 [JP] Japan .................. 60-114180
May 29, 1985 [JP] Japan .................. 60-114181
Jun. 4, 1985 [JP] Japan .................. 60-120918

[51] Int. Cl.$^4$ .................. G11B 7/00; G11B 17/00
[52] U.S. Cl. .................. 369/50; 360/73.03; 369/59; 369/240
[58] Field of Search .................. 369/44-46, 369/50, 53-54, 58-59, 240, 266-267; 360/73.01, 73.03

[56] References Cited

U.S. PATENT DOCUMENTS

| | | | |
|---|---|---|---|
| 4,338,683 | 7/1982 | Furukawa et al. | 360/73.03 X |
| 4,397,011 | 8/1983 | Ogawa | 369/50 |
| 4,423,498 | 12/1983 | Kimura et al. | 369/50 X |
| 4,466,089 | 8/1984 | Wachi | 369/50 X |
| 4,495,474 | 1/1985 | Nishikawa et al. | 369/50 X |
| 4,500,982 | 2/1985 | Yoshida | 369/50 |
| 4,539,666 | 9/1985 | Wachi | 369/50 |
| 4,611,319 | 9/1986 | Naito | 369/50 X |
| 4,623,939 | 11/1986 | Machida et al. | 369/50 X |
| 4,675,855 | 6/1987 | Iso et al. | 369/50 X |
| 4,700,337 | 10/1987 | Inagawa et al. | 369/50 |

FOREIGN PATENT DOCUMENTS

57-58269 4/1982 Japan .

Primary Examiner—Alan Faber
Assistant Examiner—W. R. Young
Attorney, Agent, or Firm—Wenderoth, Lind & Ponack

[57] ABSTRACT

A rotation control apparatus for controlling a rotation of a recording medium in which a signal modulated in a run length limited code has been recorded in concentric or spiral information tracks at a constant linear velocity. An inversion time detecting circuit alternately detects a maximum or minimum transition interval of a reproduced digital signal from its rise transition to its fall transition, and a maximum or minimum transition interval of the reproduced digital signal from its fall transition to its rise transition, so as to thereby produce a transition interval signal corresponding to each of the detected maximum or minimum values. A motor drive circuit drives a motor in such a direction as to reduce a difference between the value of the transition interval signal and a predetermined value.

3 Claims, 4 Drawing Sheets

APPARATUS FOR CONTROLLING ROTATION OF A RUN LENGTH LIMITED CODE MODULATED INFORMATION RECORDING MEDIUM

This application is a continuation of now abandoned application Ser. No. 865,010 filed May 20, 1986.

BACKGROUND OF THE INVENTION

1. Field of the Invention

The present invention relates to a recording medium rotation control apparatus for an information reproducing apparatus for reproducing information from a recording medium in which information modulated in a run length limited code has been recorded on concentric or spiral information tracks at a constant linear velocity.

2. Description of the Prior Art

In some recording media, information modulated in the run length limited code is recorded on concentric or spiral information tracks at a constant linear velocity in order to increase recording density as shown, for example, in U.S. Pat. Nos. 4,397,011 and 4,466,089. The compact disk is a typical example of such recording media. When information is to be reproduced from a recording medium of this type, it is necessary to maintain the linear velocity of the recording medium constant by changing the rotation velocity thereof according to the position of an information track from which information is to be reproduced.

In order to accomplish this, there is available a method for controlling the rotation of the recording medium to be a constant linear velocity by using a signal reproduced from the recording medium as disclosed, for example, in Japanese Laid-Open Patent Application No. 57-58269. This method utilizes the principle that a maximum or minimum transition interval time from one state inversion ("0" to "1" or "1" to "0") to the next state inversion of a signal reproduced from the recording medium varies with the linear velocity during reproduction. Namely, such maximum or minimum transition interval is compared with a reference value of maximum or minimum transition interval which is determined in dependance upon the modulating method, thus achieving rotation control for the constant linear velocity.

This method, however, has a defect in that control errors would easily occur due to the an erroneous deviation of transition interval or of the detected maximum or minimum transition interval. Such an erroneous deviation of the transition interval is caused by the asymmetry of the pulse waveform of the reproduced signal as shown in U.S. Pat. Nos. 4,397,011 or No. 4,466,098 or by a deviation of a threshold level for reshaping the pulse waveform of the reproduced signal. This method further has a defect in that the rotation control would be easily disturbed since the maximum or minimum transition interval undergoes a great change when the reproducing means moves across an information track of the recording medium or when the linear velocity is so small that the reproducing means cannot accurately track the information tracks of the recording medium.

SUMMARY OF THE INVENTION

It is an object of the present invention to provide a recording medium rotation control apparatus which is hardly influenced by an erroneous deviation of a state transition interval or a detected minimum or maximum transition interval of a reproduced signal from a recording medium.

It is another object of the present invention to provide a recording medium rotation control apparatus which is hardly influenced by variations of the maximum or minimum transition interval which are produced when a reproducing means moves across an information track of a recording medium or when the linear velocity is so small that the reproducing means cannot accurately track the information tracks of the recording medium.

In order to achieve the above objects, the recording medium rotation control apparatus in accordance with the present invention comprises:

a motor for rotating a recording medium in which a signal modulated in a run length limited code has been recorded in concentric or spiral information tracks at a constant linear velocity;

a reproducing means for reproducing recorded signal from the recording medium to supply a reproduced signal;

a waveform reshaping means for reshaping the waveform of the reproduced signal supplied from the reproducing means to supply a reproduced digital signal;

a transition interval detecting means for alternately detecting at predetermined intervals a maximum (or minimum) transition interval of the reproduced digital signal from its rise transition to its fall transition and a maximum (or minimum) transition interval of the reproduced digital signal from its fall transition to its rise transition, so as thereby supply transition interval signal having a value corresponding to each of such maximum (or minimum) transition intervals; and a motor drive means for driving the motor in such a direction as to reduce a difference between the value of the transition interval signal and a predetermined value. With this arrangement the apparatus in accordance with the present invention can achieve a highly accurate rotation control which is hardly influenced by an erroneous deviation of the state transition interval or the detected maximum or minimum transition interval of the reproduced signal.

The rotation control apparatus in accordance with the present invention may include a transition interval detecting means for dividing the frequency of the reproduced digital signal and then detecting a minimum transition interval of the frequency-divided reproduced digital signal from one state inversion to the next state inversion, so as to thereby supply a transition interval signal corresponding to such having a value minimum transition interval. With this arrangement, the rotation control apparatus in accordance with the present invention can achieve a highly accurate rotation control which is hardly influenced by variations of the maximum or minimum transition interval which are produced when the reproducing means moves across an information track of the recording medium or when the linear velocity is so small that the reproducing means cannot accurately track the information track of the recording medium.

DESCRIPTION OF THE PREFERRED EMBODIMENTS

Figure 1:
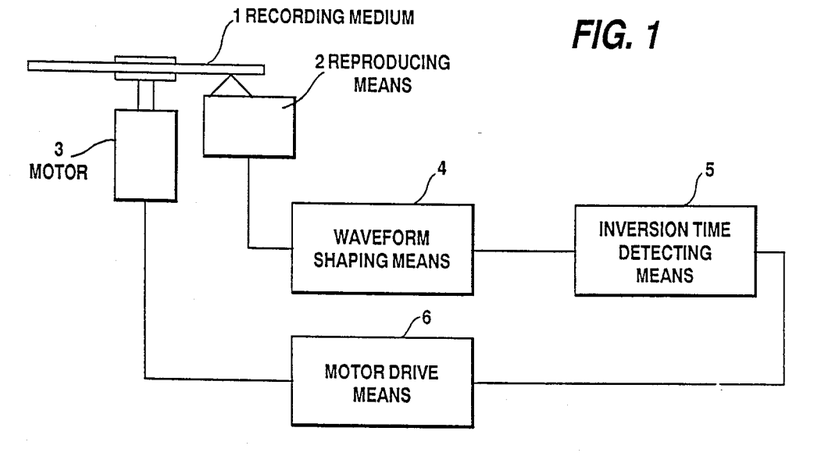
FIG. 1 is a block diagram of a rotation control apparatus in accordance with one embodiment of the present invention.

FIG. 1 is a block diagram of a rotation control apparatus in accordance with one embodiment of the present invention. In FIG. 1, the rotation control apparatus coupled to a recording medium 1 comprise a reproducing means 2 including a reproducing head, a motor 3, a waveform reshaping means 4, a transition interval detecting means 5 and a motor drive means 6. The reproducing means 2 is adapted to reproduce a digital signal recorded on an information track of the recording medium 1. Such reproducing may be made optically or magnetically, or by the use of electrostatic capacity. If necessary, the reproducing means 2 may include a means for tracking control or optical focus control. A reproduced signal supplied from the reproducing means 2 has a deteriorated waveform because the recording density of the recording medium 1 has been enhanced up to the vicinity of the reproducible limit of the reproducing means 2. The reproduced signal therefore has its waveform reshaped by the waveform reshaping means 4 so as to be a reproduced digital signal having a waveform (rectangular) closer to the waveform before it was recorded. The waveform reshaping means 4 may be a simple comparator for comparing the level of the reproduced, signal with a threshold level. The comparator may be so arranged that the threshold level follows the center level of the reproduced signal. The transition interval detecting means 5 receives the reproduced digital signal so as to supply a transition interval signal having a value corresponding to the maximum or minimum transition interval. The detailed description of the operation of the transition interval detecting means 5 will be discussed later. The maximum or minimum transition interval is in inverse proportion to the linear velocity of the recording medium, so that the transition interval signal also has a value corresponding to the linear velocity. The motor drive means 6 compares the value of the transition interval signal with a reference value corresponding to a control target to drive the motor 3 in such direction as to reduce a difference between the value of the transition interval signal and the reference value. The motor 3 is driven by the motor drive means 6 to apply a rotational torque to the recording medium. In such manner, the linear velocity of the recording medium can be controlled so as to be a predetermined constant value.

Figure 2:
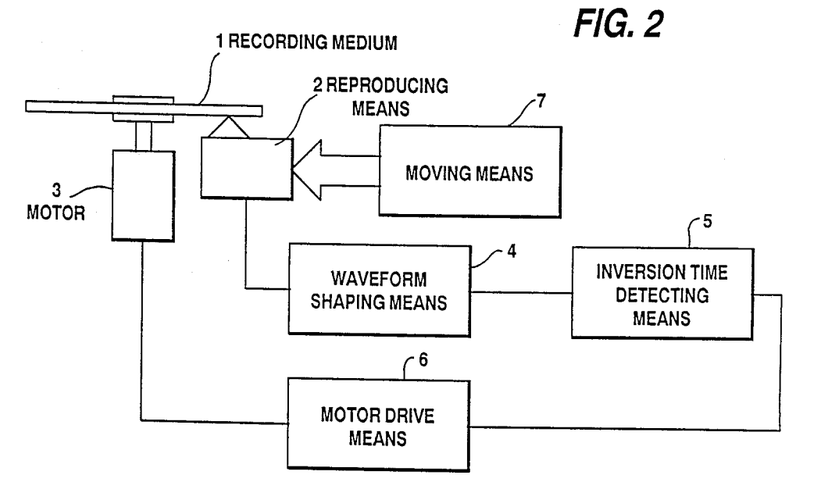
FIG. 2 is a block diagram of a rotation control apparatus in accordance with another embodiment of the present invention.

FIG. 2 is a block diagram of a rotation control apparatus in accordance with another embodiment of the present invention. This rotation control apparatus is the same as the apparatus in FIG. 1 except that it includes a moving means for moving the reproducing means 2 in the radial direction of the recording medium. The transition interval detecting means 5 can extract linear velocity information from a reproduced digital signal which is intermittently reproduced while the reproducing means 2 is moving in the radial direction of the recording medium. In this embodiment too, the linear velocity can be controlled so as to be a predetermined constant value as in the embodiment in FIG. 1.

Figure 3:
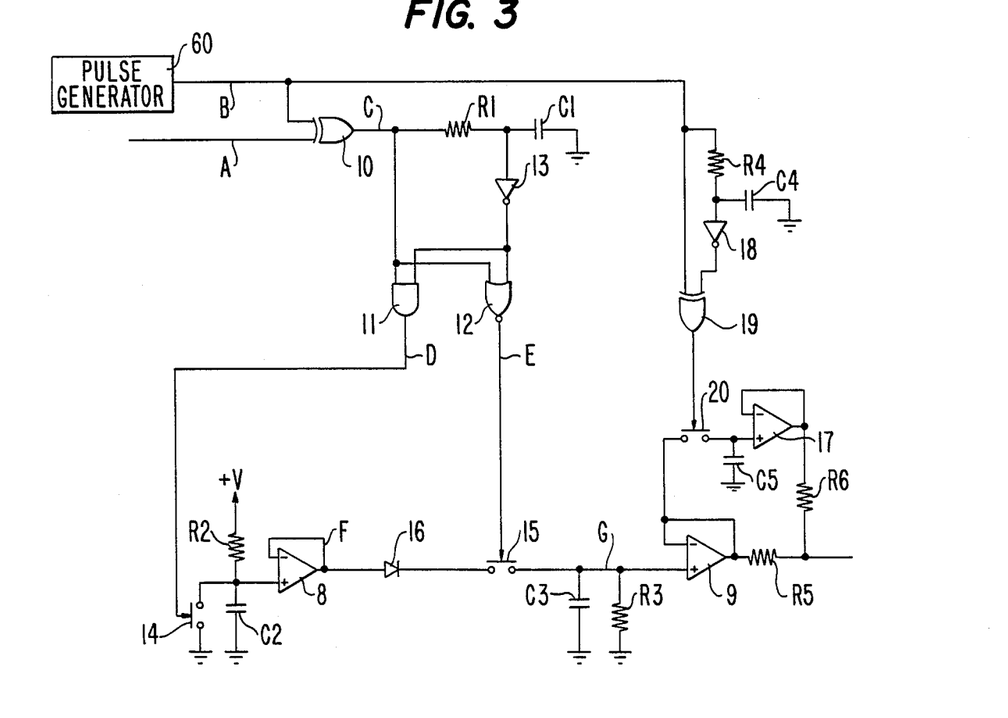
FIG. 3 is a circuit diagram of a first example of a transition interval detecting means.
Figure 4:
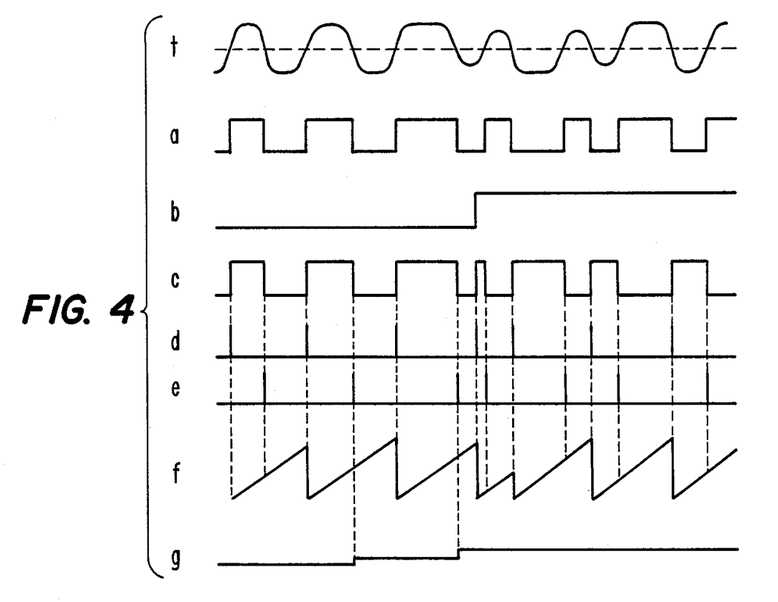
FIG. 4 is a diagram showing signal waveforms at respective portions of the circuit in FIG. 3.

FIG. 3 is a circeuit diagram of a first example of the transition interval detecting means. FIG. 3 shows operational amplifiers 8, 9 and 17, exclusive-OR gates 10 and 19, an AND gate 11, a NOR gate 12, NOT gates 13 and 18, analog switches 14, 15 and 20, resistors R1 to R6, capacitors C1 to C5, and a diode 16. The operation of the transition interval detecting means constructed as above will be explained with reference to FIG. 4. FIG. 4 shows the waveforms of signals at the respective parts in FIG. 3. In FIG. 4, a to g show respectively the waveforms of signals at points A to G in FIG. 3. In FIG. 4, t represents a reproduced signal supplied from the reproducing means 2, while the broken line represents a threshold level for the waveform reshaped by the waveform reshaping means 4. A resultant reproduced digital signal supplied from the waveform reshaping means 4 is represented by a. At this time, if the threshold level is varied for some reason, the duty factor of the reproduced digital signal a varies due to the deteriorated waveform of the reproduced signal t and thus the maximum transition interval also varies. However, the duration of a high ("H") level state and the duration of a low ("L") level state of the reproduced digital signal change in opposite direction to each other. For example, when the threshold level deviates to a higher level, the duration of the "H" level state of the reproduced digital signal decreases while the duration of the "L" level state increases. Accordingly, when the maximum pulse durations at the respective "H" and "L" levels are detected and their average is obtained, the erroneous variations are cancelled so that an accurate value can be obtained. For achieving this in a simple manner, two circuits each having the same arrangement are required. The circuit arrangement in FIG. 3 can produce the equivalent effect with the addition of a simple circuit. A pulse generator 60, for example, generates a polarity changeover signal b which is a periodic pulse signal inverting in level at predetermined intervals. A reproduced digital signal a supplied from the point A passes through the gate 10. At this time, when the polarity changeover signal b at the point B is an "L" level, the reproduced digital signal passes as is through the gate 10, but when the polarity changeover signal is an "H" level, the reproduced digital signal is inverted. The resistor R1, the capacitor C1 and the gate 13 and constitute a delay circuit. Together with the gates 11 and 12, this delay circuit produces rise transition and fall transition edge pulses d and e from the signal c entered to the point C. The rise transition edge pulse d closes the analog switch 14 to discharge the capacitor C2. Thereafter, the capacitor C2 is charged through the resistor R2. When the fall transition edge pulse e closes the analog switch 15, the voltages at the points F and G are compared with each other through the diode 16. When the voltage at the point G is lower than that at the point F, the capacitor C3 is charged so that the both voltages become equal to each other. The resultant voltage at the point G or the output of the operational amplifier 9 is in proportion to the maximum transition interval. The polarity changeover signal b at the point B is also supplied to an edge detecting circuit constituted by the resistor R4, the capacitor C4 and the gates 18 and 19. Each time the polarity changeover signal is inverted, the gate 19 supplies a sampling pulse. The sampling pulse closes the analog switch 20, and the output of the operational amplifier 9 is sampled in the capacitor C5. Through the resistors R5 and R6, there is supplied, as a transition interval signal, the average of the output of the operational amplifier 9 and the output of the operational amplifier 17 which is holding the maximum transition interval in the previous sampling. When the frequency of the polarity changeover signal at the point B is sufficiently high as compared with the response frequency of the rotation control apparatus, the circuit for the sampling and average calculation can be omitted and the output of the operational amplifier 9 can be used as a transition interval signal. The resistor R3 is operative to erase past data of linear velocity so that the latest data of linear velocity can be maintained in the capacitor C3 at all times.

As thus described, the present invention can provide a rotation control apparatus which is hardly influenced by an erroneous deviation of the state transition interval or the detected maximum transition interval of the reproduced signal.

In this example, the description has been made of the circuit for detecting a maximum transition interval, but a circuit for detecting a minimum transition interval can be arranged with a minor modification. For such a purpose, it is merely necessary to invert the polarity of the diode 16 and to change the connection of the resistor R3 from ground to a supply voltage +V. The thus modified circuit can also bring about such a result achieved in this example in that the influence by the erroneous transition interval deviation is hardly exerted.

The transition interval detecting means in FIG. 3 is merely one example. The transition interval detecting means can be arranged in any way as long as it alternately detects a maximum or minimum transition interval of a reproduced digital signal from its rise transition to its fall transition and a maximum or minimum transition interval of the reproduced digital signal from its fall transition to its rise transition, so as to thereby supply a transition interval signal having a value corresponding to such a maximum or minimum transition interval. In this example, as the linear velocity is increased, the transition interval signal changes so as to be reduced in value. The inversion time detecting means can also be arranged so that the transition interval signal is increased in value as the linear velocity is increased.

Figure 5:
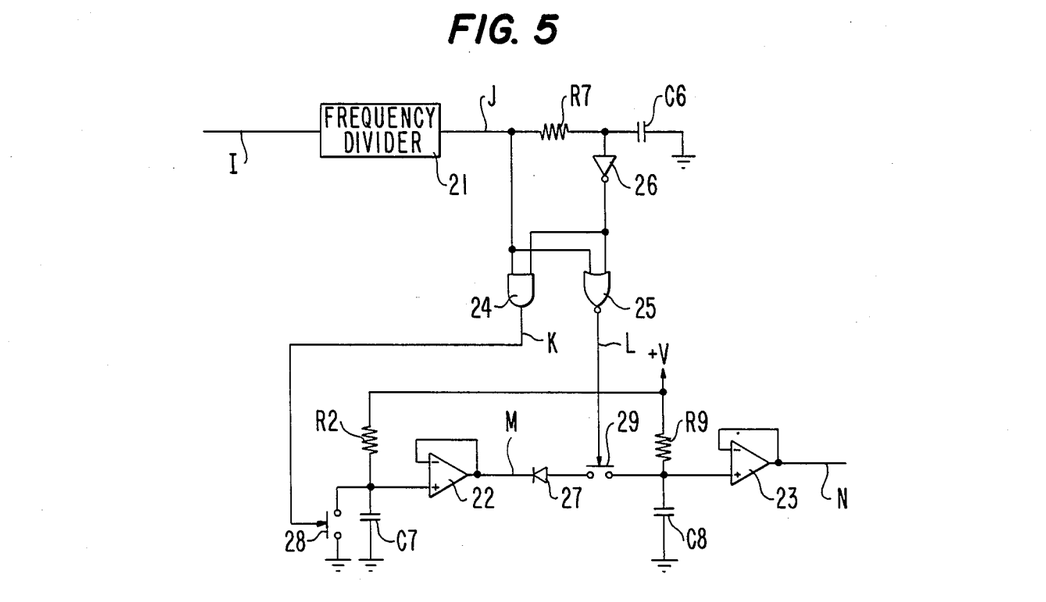
FIG. 5 is a circuit diagram of a second example of a transition interval detecting means.
Figure 6:
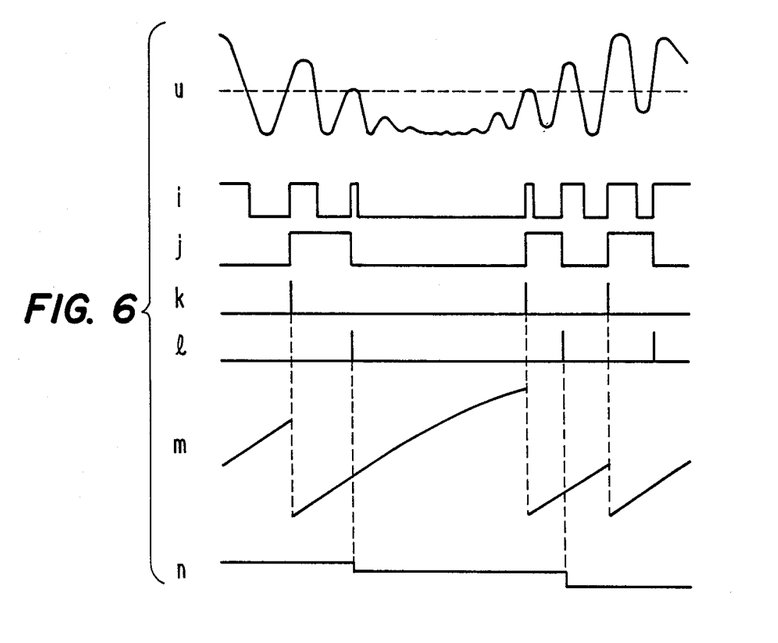
FIG. 6 is a diagram showing signal waveforms at respective portions of the circuit in FIG. 5.

FIG. 5 is a circuit diagram of a second example of the transition interval detecting means. FIG. 5 shows a frequency divider 21, operational amplifiers 22 and 23, an AND gate 24, a NOR gate 25, a NOT gate 26, analog switches 28 and 29, resistors R8 to R9, capacitors C6 to C8 and a diode 27. This example is the same as the first example except for the polarity of the diode 27, the connection of the resistor R9 and the provision of the frequency divider 21. Accordingly, the transition interval detecting means in FIG. 5 is so arranged as to detect a minimum transition interval of a reproduced digital signal after being frequency-divided. FIG. 6 illustrates the waveforms of signals at the respective parts in FIG. 5. In FIG. 6, i to n represent the waveforms of signals at points I to N in FIG. 5. The frequency of a reproduced digital signal i is first divided by two by the frequency-divider 21 to form signal j. The subsequent operations until a voltage which is substantially in proportion to the minimum transition interval of the reproduced digital signal thus frequency-divided by two appears at the output N of the operational amplifier 23, are substantially the same as those of the circuit shown in FIG. 3. FIG. 6 shows the waveforms of signals at a time when the reproducing means 2 enters a gap between information tracks of the recording medium. At u in FIG. 6, the solid line represents a reproduced signal from the reproducing means 2, while the broken line represents a threshold level for the waveform reshaped by the waveform shaping means 4. Between information tracks, a reproduced signal is attenuated and no correct information of linear velocity can be obtained due to noise or cross-talk. The threshold level is therefore set to a value which deviates from the center value of the reproduced signal between information tracks, as shown in FIG. 6. At this time, the duty factor of the reproduced digital signal i greatly varies and the reproduced digital signal includes a pulse of a narrow width which cannot be included when the reproducing means 2 tracks the information tracks for reproducing the information. It is, however, understood from FIG. 6 that the minimum transition interval of the frequency-divided reproduced signal j is hardly subject to the resultant influence. A transition interval signal n therefore gives accurate information of linear velocity.

This example can also be utilized for detecting a brake termination for stopping the rotation of the recording medium. When a recording medium stop command (which is produced when a "STOP" button of the information reproducing apparatus is pushed or when reproduction from one recording medium is completed in the well-known manner) is received, the motor drive means 6 begins driving the motor 3 in the reverse direction to the rotating direction of the motor to reduce the speed of the motor 3. When it is detected from a transition interval signal that the transition interval has exceed a avalue corresponding to a predetermined adequately small linear velocity, the motor drive means 6 stops such reverse directional driving so that the motor 3 can smoothly stop after moving a certain small distance due to its inertia. If the reverse directional driving is not stopped, the motor will begin rotating in the reverse direction. If the timing of stopping the reverse directional driving is not optimum, the motor 3 cannot stop quickly or smoothly. In a concrete manner, for example, the motor drive means 6 supplies the entered transition interval signal and the value corresponding to the predetermined adequately small linear velocity to a comparator, and an output signal from the comparator and the record medium stop command then compose a signal for reverse-driving the motor by a simple logic circuit. The transition interval detecting means in this example can detect the transition interval with high accuracy even though the linear velocity becomes too small to stably perform the tracking control by the reproducing means. The sufficient reduction in the speed of the recording medium can therefore be detected accurately without delay, so that the brake can be released at an optimum timing. As a result, the rotation of the recording medium can be quickly stopped.

According to this example, even when the reproducing means moves across an information track of the recording medium, the transition interval signal can be accurately obtained, so that the rotation of the recording medium can be controlled to make the linear velocity constant according to the position of the reproducing means. Moreover, when the transition interval detecting means of this example is used for detecting a brake termination for stopping the rotation of the recording medium, the rotation of the recording medium can be quickly stopped.

The transition interval detecting means in FIG. 5 is merely one example. The transition interval detecting means can be arranged in any way as long as it can detect a minimum transition interval of a reproduced digital signal after being frequency-divided, from one state inversion to next state inversion, so as to thereby supply a transition interval signal having a value corresponding to the detected minimum transition interval. In the example shown in FIG. 5, the frequency-divider 21 divides a frequency of a signal by two, but the division number is not limited to two. It is, however, noted that, as the division number is increased, the frequency at which a minimum run length is continuously generated, is reduced. Therefore, an increased division number assures more stable detectionof a minimum transition interval, but such a detection with an increased division number takes more time. It is therefore desirable to minimize the division number to such an extent that the stability of detection of a minimum transition interval is not reduced.

In this example, as the linear velocity is increased, the transition interval signal is changed so as to be reduced in value. The transition interval detecting means can also be arranged so that the transition interval signal is increased in value as the linear velocity is increased.

Figure 7:
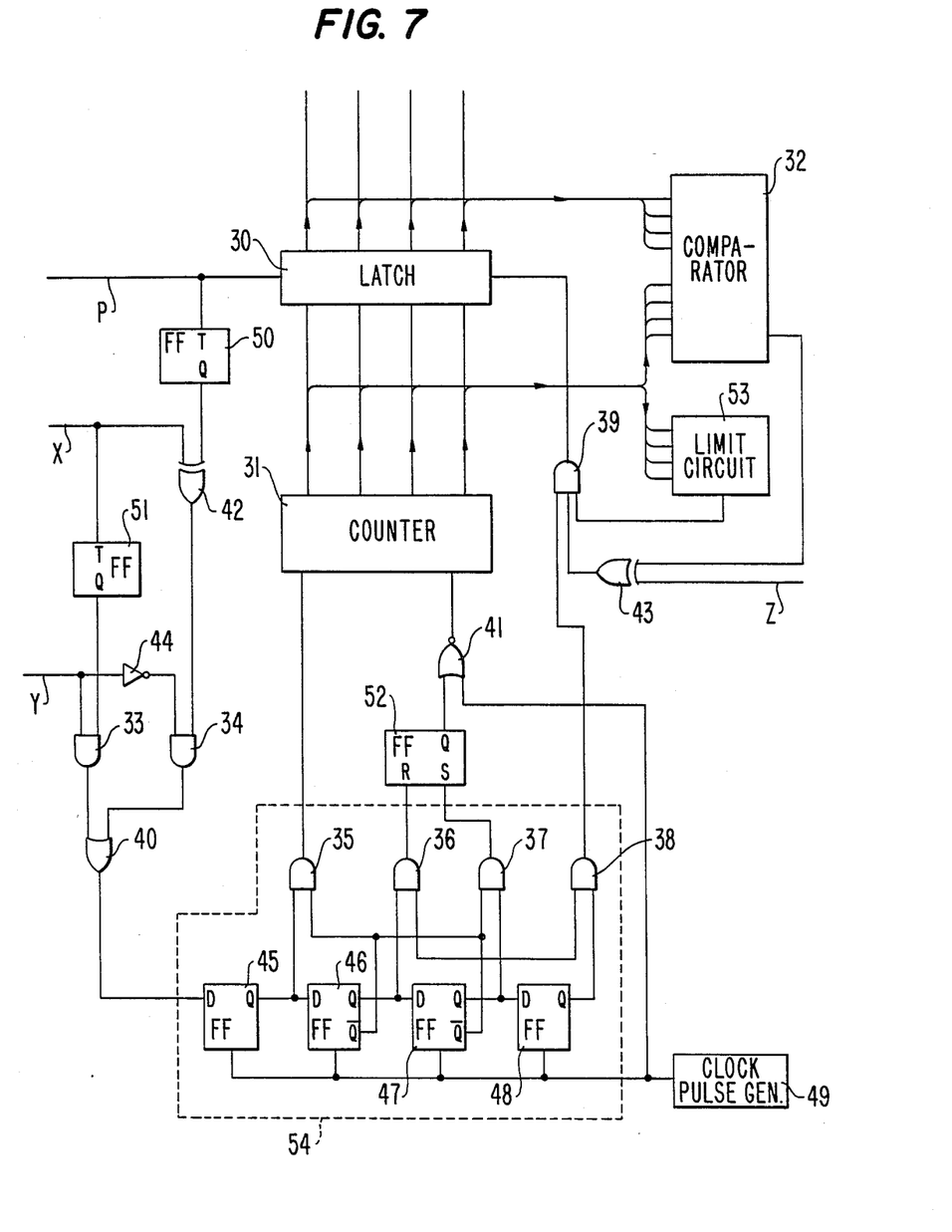
FIG. 7 is a circuit diagram of a third example of interval detecting means.

FIG. 7 is a circuit diagram of a third example of the transition interval detecting means which is a digital circuitry version for selectively performing the functions of the embodiments in FIGS. 3 and 5 according to the operation mode of the information reproducing apparatus. FIG. 7 shows a latch 30, a counter 31, a magnitude comparator 32, AND gates 33 to 39, an OR gate 40, a NOR gate 41, Exclusive-OR gates 42 and 43, a NOT gate 44, D flip-flops 45 to 48, a clock pulse generator 49, T flip-flops 50 and 51, an RS flip-flop 52 and a limit circuit 53.

The description will first discuss the operation of this circuit when a point Y is at an "H" level.

A reproduced digital signal entered from a point X is divided in frequency by two by the T flip-flop 51, passes through a selector constituted by the gates 33, 34, 40, 44, and is sent to a timing pulse generating circuit 54 constituted by the D flip-flops 45 to 48 and the gates 35 to 38. The clock pulse generator 49 supplies a clock pulse to the counter 31 through the D flip-flops 45 to 48 and the gate 41. The timing pulse generating circuit 54 generates a rise transition edge pulse, a fall transition edge pulse and their delayed pulses. The RS flip-flop 52 is operated by these pulses to open/close the gate 41 connected to the clock input terminal of the counter 31. After being reset by a rise transition edge pulse supplied from the gate 35, the counter 31 counts the number of clocks supplied from the gate 41. The outputs from the counter 31 and the latch 30 are compared in magnitude by the magnitude comparator 32. When the comparison result coincides with the polarity selected by the input at a point Z, the gate 39 is opened. It is now assumed that the output of the limiting circuit 53 connected to the gate 39 is at an "H" level. When the counting of the counter 31 is complete, a latch pulse is supplied from the gate 38. If the gate 39 is open, the contents of the latch 30 are renewed to a value supplied from the counter. As a result, according to the input at the point Z, the output from the latch 30 has a value substantially in proportion to the maximum or minimum transition interval of the divided reproduced digital signal.

The reproduced digital signal may include a minor cycle noise pulse which does not appear in a normal code modulation dependent on the characteristics of the reproducing means 2 or the waveform reshaping means 4. If this was detected as a minimum transition interval, correct control cannot be achieved. In particular, when the reproducing means moves across an information track of the record medium, such a phenomenon often occurs. In this case, the output of the counter 31 is monitored by the limiting circuit 53 and, if a value is counted which does not appear to be in a normal control range, the output of the limiting circuit 53 becomes an "L" level, so that the gate 39 is closed to prevent the data renewal of the latch 30. The limiting circuit 53 can be formed, for example, by an AND gate to which a signal having arbitrary upper bits out of the output of the counter 31 is entered, when the counter 31 is of the up-counter type. With the above arrangement, the bad influence of the minor cycle noise pulse can be eliminated. When the reproduced digital signal does not contain the minor cycle noise pulse or when the transition interval detecting means is used for detecting the maximum transition interval, the limiting circuit 53 can be omitted.

The input line P is connected to a prset input line of the latch 30 for presetting a value at the beginning of sampling for detection of a transition interval. A preset value loaded to the latch 30 at this time is required to be changed depending on the operation state of detection of a maximum or minimum transition interval. The input P is supplied to the T flip-flop 50 to invert the output thereof.

When the input Y is in "L" level, the gate 42 alternately repeats an inversion operation and a non-inversion operation every sampling period by the output of the T flip-flop 50 which is inverted every sampling period and is connected to one input terminal of the gate 42. A reproduced digital signal entered from the point X is sent to the other input terminal of the gate 42. After being either inverted or non-inverted, this signal passes through the selector constituted by the gates 33, 34, 40, 44, and is sent to the D flip-flop 45. The subsequent operations are effected in the same manner as in the case where the input Y is at an "H" level. As a result, according to the value of input Z, the output from the latch 30 has a value in proportion to the maximum or minimum transition interval of a reproduced digital signal. However, the detected polarity is inverted every sampling period.

According to this example, there can be provided a rotation control apparatus which is hardly influenced by an erroneous deviation of the state transition interval or detected maximum or minimum transition interval of a reproduced signal. Even if the reproducing means moves across an information track of the recording medium, a transition interval signal can be accurately obtained so that the rotation of the recording medium can be controlled to make the linear velocity constant according to the position of the reproducing means.

When the transition interval detecting means according to this example is used for detection of a brake termination for stopping the rotation of the recording medium, the rotation of the recording medium can be quickly stopped. In such case, the transition interval detecting means is arranged so as to detect a minimum transition interval, and the recording medium braking operation can be made by the motor drive means in the same manner as in the second example.

The transition interval detecting means in FIG. 7 is merely one example. The transition interval detecting means can be arranged in any way as long as it can measure a state transition interval between one state inversion and the next state inversion of a reproduced digital signal as is or after being frequency-divided, and can detect a maximum or minimum transition interval signal having a value corresponding to such a maximum or minimum transition interval thus detected.

In FIG. 7, a 4-bit counter and latch are used, by way of example, for measuring the inversion time, but an arbitrary number of bits can be used in order to assure the accuracy required for rotation control. In this example, the description has been made of the case where the frequency of a reproduced digital signal is divided by two, but the division number is not limited to a particular one as stated in the second example.

There have been thus described and illustrated some examples of the transition interval detecting means of the recording medium rotation control apparatus in accordance with the present invention. However, the method of arranging the transition interval detecting means should not be limited to these examples. The transition interval detecting means having the same function as that in the first or second example may be arranged in a digital circuit, and the transition interval detecting means having the same function as that in the third example may be arranged in an analog circuit. A circuit may be added to the first example so that the minimum transition interval can also be detected, and a circuit may be added to the second example so that the maximum transition interval can also be detected.

When detection of a brake termination is to be made in the motor drive means, the transition interval detecting means can be so arranged that a transition interval signal is merely compared with a predetermined value, or can be arranged so as to detect that a transition interval signal is continuously below or exceeds a predetermined value for a predetermined period of time. In the latter case, erroneous operations due to noise included in the inversion time signal can be effectively prevented.

What is claimed is:

1. An apparatus for controlling rotation of a recording medium in which a signal modulated in a run length limited code has been recorded in concentric or spiral information tracks, comprising:
    a motor for rotating said recording medium at a constant linear velocity;
    a reproducing means for reproducing the recorded signal from said recording medium to supply a reproduced signal;
    a waveform reshaping means for reshaping the waveform of the reproduced signal to obtain a reproduced digital signal;
    a transition interval detecting means for detecting a maximum transition interval of the reproduced digital signal and for outputting a maximum transition interval signal having a value corresponding to the maximum transition interval of the reproduced digital signal, said transition interval detecting means comprising: an inversion means for periodically inverting the polarity of the reproduced digital signal at predetermined intervals to obtain a periodically inverting reproduced digital signal and a means for detecting a maximum transition interval of the periodically inverting reproduced digital signal in each of said predetermined intervals and for producing a detection signal having a value corresponding to the maximum transition interval of the perodically inverting reproduced digital signal in each of said predetermined intervals, said detection signal being outputted as the maximum transition interval signal; and
    a motor drive means for driving said motor so that a difference between the value of the maximum transition interval signal and a reference value is reduced.

2. An apparatus for controlling rotation of a recording medium in which a signal modulated in a run length limited code has been recorded in concentric or spiral information tracks, comprising:
    a motor for rotating said recording medium at a constant linear velocity;
    a reproducing means for reproducing the recorded signal from said recording medium to supply a reproduced signal;
    a waveform reshaping means for reshaping the waveform of the reproduced signal to obtain a reproduced digital signal;
    a transition interval detecting means for detecting a minimum transition interval of the reproduced digital signal and for outputting a minimum transition interval signal having a value corresponding to the minimum transition interval of the reproduced digital signal, said transition interval detecting means comprising: an inversion means for periodically inverting the polarity of the reproduced digital signal at predetermined intervals to obtain a periodically inverting reproduced digital signal and a means for detecting a minimum transition interval of the periodically inverting reproduced digital signal in each of said predetermined intervals and for producing a detection signal having a value corresponding to the minimum transition interval of the periodically inverting reproduced digital signal in each of said predetermined intervals, said detection signal being outputted as the minimum transition interval signal; and
    a motor drive means for driving said motor so that a difference between the value of the minimum transition interval signal and a reference value is reduced.

3. An apparatus for controlling rotation of a recording medium in which a signal modulated in a run length limited code has been recorded in concentric or spiral information tracks, comprising:
    a motor for rotating said recording medium at a constant linear velocity;
    a reproducing means for reproducing the recorded signal from said recording medium to supply a reproduced signal;
    a waveform reshaping means for reshaping the waveform of the reproduced signal to obtain a reproduced digital signal;
    a transition interval detecting means for detecting a minimum transition interval of the reproduced digital signal and outputting a minimum transition interval signal having a value corresponding to the minimum transition interval of the reproduced digital signal, said transition interval detecting means comprising: a frequency-dividing means for dividing the frequency of the reproduced digital signal to obtain a frequency-divided reproduced digital signal and a means for detecting a minimum transition interval of the frequency-divided reproduced digital signal and for producing a detection signal having a value corresponding to the minimum transition interval of the frequency-divided reproduced digital signal, said detection signal being outputted as the minimum transition interval signal; and a motor drive means for driving said motor so that a difference between the value of the minimum transition interval signal and a reference value is reduced.

* * * * *